Jan. 23, 1962 K. F. FRANK 3,017,768
VIBRATION PICKUP MEANS
Filed March 24, 1958 2 Sheets-Sheet 1
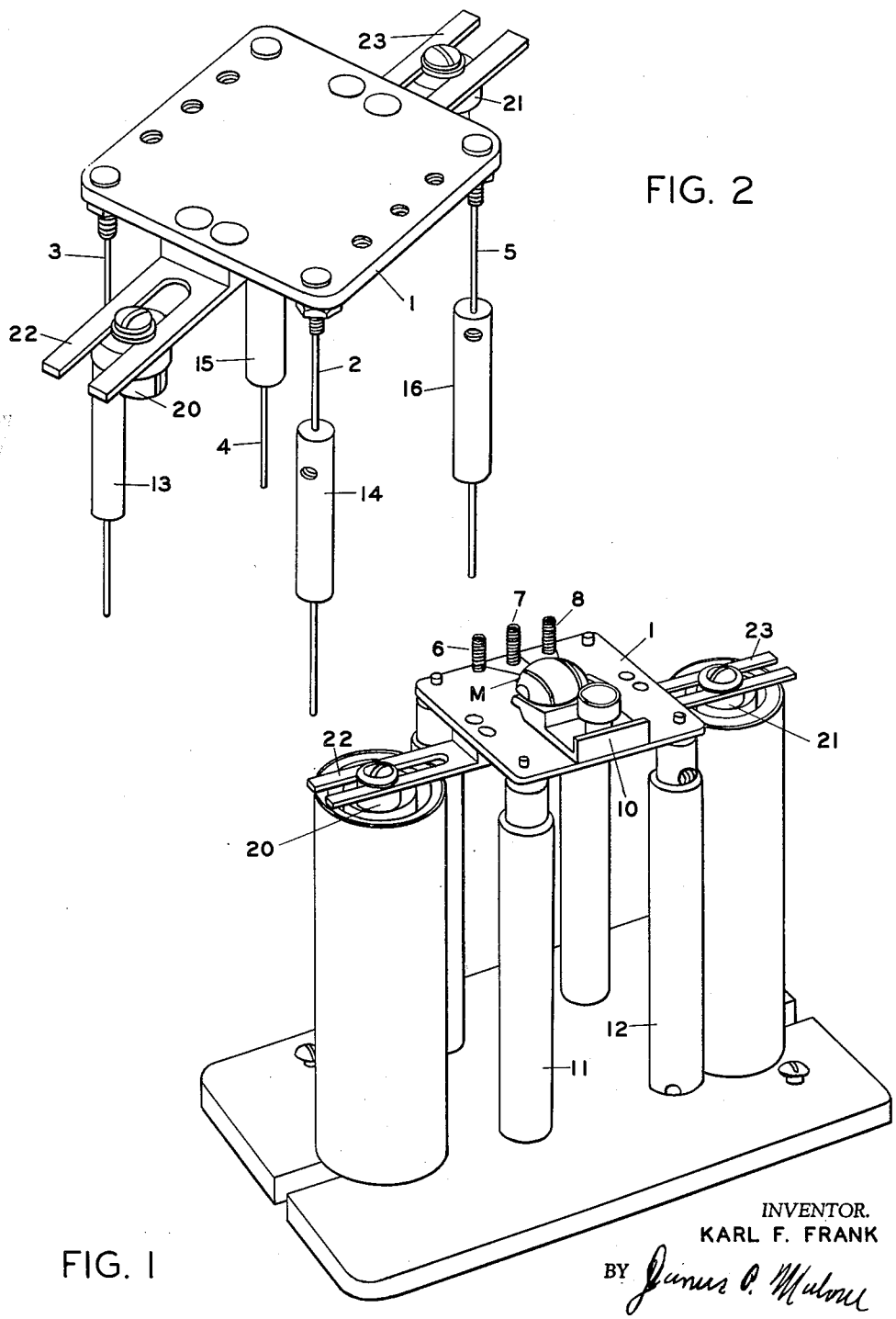
INVENTOR.
KARL F. FRANK
BY *James O. Mulroe*
ATTORNEY.

Jan. 23, 1962   K. F. FRANK   3,017,768
VIBRATION PICKUP MEANS
Filed March 24, 1958   2 Sheets-Sheet 2

INVENTOR.
KARL F. FRANK
BY [signature]
ATTORNEY.

3,017,768
VIBRATION PICKUP MEANS
Karl F. Frank, Garden City, N.Y., assignor to Micro Balancing Incorporated, Garden City Park, N.Y., a corporation of Delaware
Filed Mar. 24, 1958, Ser. No. 723,403
3 Claims. (Cl. 73—71.4)

This invention relates to sensitive pickup means for vibration detection and more particularly to very sensitive pickup means for balancing very small rotors.

Gyroscopes and electrical rotors have been miniaturized to such an extent that many such rotors now weigh on the order of one ounce and generally operate at speeds of 12,000 or 24,000 r.p.m. Due to this extremely light weight, it is extremely difficult to measure the dynamic unbalance, and conventional pickups for mounting the rotating piece are not sufficiently sensitive for balancing these extremely small high speed rotors. The order of sensitivity required of the pickup is a fraction of a micro inch. This sensitivity can not be detected and measured with any direct mechanical connections or couplings.

The present invention solves this problem by mounting the rotating piece on a platform which is mounted on four stiff wires. The pickups comprise a pair of actuator cups which are suspended in a pair of pickup cups having a viscous fluid therein. Each pickup cup is mounted on a rod which is connected to a vacuum tube transducer which is essentially a triode having its plate mounted on a diaphragm, the diaphragm being mechanically connected by the rod to one of the pickup cups. The vacuum tube provides an electrical signal proportional to the displacement caused by the unbalance. The actuator and pickup cups are arranged to limit the mechanical motion in order to protect the vacuum tube transducer. The present invention is illustrated in connection with a dynamic balancing machine but is not so limited. It may be used generally to pick up or detect any sensitive vibrations.

Accordingly, a principal object of the invention is to provide new and improved vibration pickup and detector means.

Another object of the invention is to provide new and improved pickup means for dynamic balancing.

Another object of the invention is to provide new and improved pickup means of very great sensitivity for measuring the dynamic unbalance of extremely light weight rotors.

Another object of the invention is to provide new and improved pickup means of very great sensitivity.

Another object of the invention is to provide new and improved vibration pickup means comprising means connected to the source of vibration, a liquid coupling, and a vacuum tube transducer.

These and other objects of the invention will become apparent from the following specification and drawings, of which:

FIGURE 1 is a perspective view of an embodiment illustrative of the invention.

FIGURE 2 is a perspective detail view of the mounting platform, and

Figure 3:
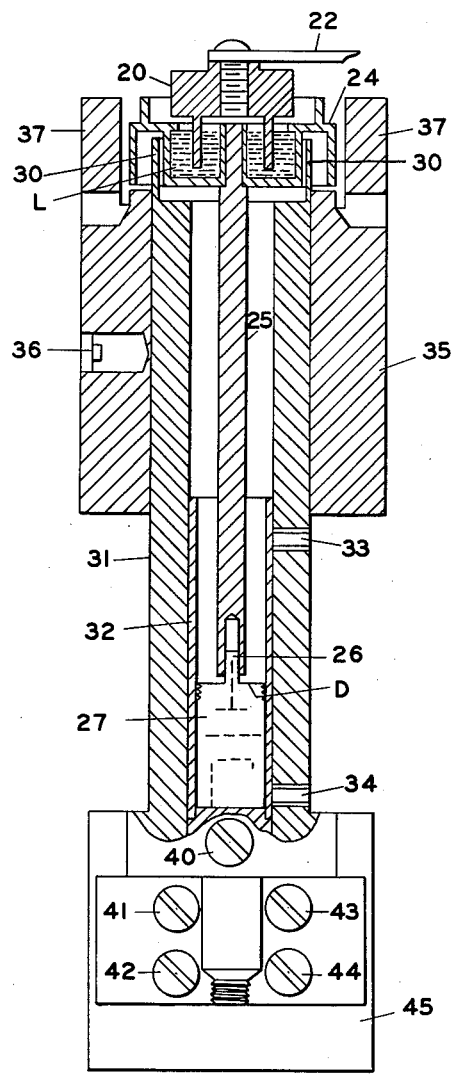
FIGURE 3 is a detail elevation view, partly in section, of a portion of the embodiment of FIGURE 1.

Referring to the figures, the invention is illustrated in a dynamic balancing machine. A platform 1, which is preferably a plate of insulating material, is flexibly mounted on four stiff wires 2, 3, 4, and 5, one at each corner. The tops of the wires are rigidly connected to the platform, for instance, by soldering to eyelets in the platform. This type mounting is only used with rotors which can be electrically driven. The electrical connections are made through the stiff wires to terminals 6, 7, and 8 which may be springs adapted to receive the leads from the motor M under test. The present mounting is specifically designed for testing extremely small motors. In other words, if a plain rotor were to be tested, it would have to be mounted in a special motor housing in order to rotate it. The motor housing is clamped to the platform by means of the clamp 10.

The four stiff wires are mounted to stationary tubes 11, 12, and so forth, by means of connecting rods 13, 14, 15, and 16 which are adjustably mounted on the wires and adapted to be connected to the wires by means of set screws. The rods are adjustable on the wires in order to tune out any resonance effects. The rods are then mounted in stationary tubes 11, 12 and so forth, by means of set screws or other holding means.

The pickup means generally comprise a pair of actuator cups 20, 21 which are adjustably mounted on slotted brackets 22, 23 which are fixed to the platform 1 along the axis of rotation.

Referring now to FIGURE 3, the actuator cup 20 is suspended by the bracket 22 and extends into the pickup cup 24 which is mounted on a rod 25 which is connected at its other end to the tip 26 of the transducer vacuum tube 27.

The leads from the transducer tube may be connected to the terminals 40, 41, 42, 43, and 44 mounted on the platform 45 which supports the main mounting tube 31. The transducer tube 27 is preferably a commercially available vacuum tube triode which is characterized by the fact that the plate of the tube is mounted on a movable diaphragm D having the extending tip 26. A suitable tube is RCA type 5734. The vacuum tube operates in conventional manner and provides an electrical signal proportional to the movement of the diaphragm and plate due to the change in spacing between the plate and grid of the tube. The transducer tube may be conventional, and its detail construction is outside the scope of the present invention.

Transducer tubes of this type are necessarily very fragile and the amount of movement of the tip 26 must be limited to ±30 minutes of rotation. If this rotational bending limit is exceeded, the tube may be damaged. Therefore, special precaution must be taken. The travel of the pickup cup 24 is limited by the wall 30 of the main mounting tube 31. The transducer tube 27 is adjustably mounted inside the main mounting tube 31 by means of the sleeve 32 which may be a split piece of tubing adapted to be tightened by clamping screws in the holes 33 and 34 of the main mounting tube 31. An outer protective member 35 has an extending wall 37 for the purpose of protecting the cup pickup. Member 35 is fastened to tube 31 by set screw 36.

The pickup cup 24 is filled with a liquid L, preferably silicon damping fluid or other equivalent of relatively high viscosity. There is no mechanical connection between the actuator cup 20 and the pickup cup 24 except that provided through the fluid medium. Therefore, no centering adjustment is necessary and there is a minimum possible drag on the pickup bracket. This feature, together with the stiff wire mounting and the sensitivity of the vacuum tube transducer provides pickup means of extremely high sensitivity. Pickups of the present type have successfully measured displacements of .25 micro inch or better.

The pickup of the present invention may be connected to the source of vibration in a variety of ways. If the source of vibration is large, the platform may be dispensed with and the brackets 22 and 23 may be directly connected to the vibration source.

The operation of the embodiment shown is as follows:
The applicant's device detects horizontal motion. The pickup cup moves horizontally and tilts the plate of vacuum tube 27 which is mounted on a very sensitive diaphragm D, FIGURE 3.

The pickup cup is open to atmospheric pressure. The motion of the actuator transmits a pressure wave through the fluid to the pickup cup. Every force must have a reaction. A small pebble dropped in a calm pool will send pressure waves for 50 or more feet in water.

Applicant is measuring very small movements and is using a very sensitive pickup. His purposes are to transmit small forces without loading the source and also to protect the pickup.

The motor to be tested is mounted in a clamp 10 on platform 1 and the motor leads connected to the terminals 6, 7, and 8. If one of the terminals is connected to one of the mounting wires which are then connected through their respective mounting tubes to a suitable source of electricity, when the motor is energized at the rated speed, any unbalance will cause displacement of the actuator cups 20 and 21 which will move the respective pickup cups and its connecting rod 25, FIGURE 3. Movement of the rod 25 causes a movement of the plate of the vacuum tube 27 thereby causing a change in the electrical signal outside of the vacuum tube 27.

The phase of the displacement with respect to the position of the rotor is then determined by conventional technique, which is outside the scope of the present invention, by triggering a stroboscopic light which will illuminate the portion of the rotor which needs correction. Numbers are generally placed around the rotor to facilitate this measurement. A small drill hole is then made at the indicated point in order to remove weight for the purpose of balancing the rotor. The correction plane is established previously by conventional techniques. The techniques of measuring and correcting the dynamic unbalance are outside the scope of the present invention which is limited to the particular pickup means described.

Therefore, the present invention provides an extremely sensitive pickup means for measuring dynamic unbalance which will determine unbalance vibrations as small as one-quarter of one millionth of an inch. The present invention may be used for extremely small rotors having a weight of the order of one ounce. The rotors are balanced at their normal operating speeds, for instance, 12,000 or 24,000 r.p.m. The extremely small inertia of the rotor platform and low resonance of suspension enables the present invention to detect minute dynamic unbalance in the rotor. The pickup of the present invention is non-magnetic and is, therefore, not affected by external magnetic fields, electrostatic fields, or magnetized rotors.

The pickup of the present invention is not limited to dynamic balancing machines by may be used wherever detection of small vibrations is required.

I claim:

1. Vibration detector means for detecting vibration of a source of horizontal vibration, comprising actuator means rigidly connected to said source, a vertical rod, pickup means comprising a cup mounted on top of said rod and partially filled with a liquid open to atmospheric pressure said actuator means being suspended in said liquid whereby horizontal motion of said actuator means is communicated through said liquid to said cup and said vertical rod transmits said motion.

2. Means for detecting vibrations of a source of horizontal vibration, comprising an actuator cup rigidly connected to and vibrated by said source, a vertical rod, a pickup cup mounted on the upper end of said rod, said pickup cup being open to atmospheric pressure and partially filled with liquid, said actuator cup being suspended in said liquid in said pickup cup, the other end of said vertical rod being mounted on electrical signal means.

3. Apparatus as in claim 2 wherein said electrical signal means comprises a vacuum tube of the type having a plate member movable with respect to a grid member, said plate member being connected to said rod.

References Cited in the file of this patent
UNITED STATES PATENTS

| | | |
|---|---|---|
| 2,484,761 | Stock | Oct. 11, 1949 |
| 2,502,132 | Effromson et al. | Mar. 28, 1950 |
| 2,534,918 | Kroft et al. | Dec. 19, 1950 |
| 2,674,885 | Silverman | Apr. 13, 1954 |